US006988325B2

(12) United States Patent
Philippe et al.

(10) Patent No.: US 6,988,325 B2
(45) Date of Patent: Jan. 24, 2006

(54) BIDIRECTIONAL FORAGE BALE DRYER AND METHOD OF OPERATION

(75) Inventors: Savoie Philippe, Sainte-Foy (CA); Descôteaux Sébastien, Québec (CA)

(73) Assignee: Agriculture & Agro-Food Canada, Sainte-Foy (CA)

( * ) Notice: Subject to any disclaimer, the term of this patent is extended or adjusted under 35 U.S.C. 154(b) by 0 days.

(21) Appl. No.: 10/810,563

(22) Filed: Mar. 29, 2004

(65) Prior Publication Data

US 2005/0210699 A1  Sep. 29, 2005

(51) Int. Cl.
F26B 21/06 (2006.01)
(52) U.S. Cl. .......................... 34/191; 34/209; 34/210; 34/218
(58) Field of Classification Search ................. 34/191, 34/209, 210, 218, 487–489; 432/181
See application file for complete search history.

(56) References Cited

U.S. PATENT DOCUMENTS

| 1,981,436 | A |   | 11/1934 | Shodron |
| 2,601,728 | A |   | 7/1952 | Erfurth |
| 2,722,058 | A |   | 11/1955 | Heal |
| 3,572,663 | A |   | 3/1971 | Van Der Lely |
| 4,098,008 | A | * | 7/1978 | Schuette et al. ............. 34/191 |
| 5,276,980 | A | * | 1/1994 | Carter et al. .................. 34/191 |
| 6,079,119 | A |   | 6/2000 | Magnusson |
| 6,598,313 | B2 |   | 7/2003 | Beltrame |

FOREIGN PATENT DOCUMENTS

| EP | 361099 | 4/1990 |
| EP | 534382 | 3/1993 |

* cited by examiner

*Primary Examiner*—Jiping Lu
(74) *Attorney, Agent, or Firm*—Ogilvy Renault LLP; Guy J. Houle

(57) ABSTRACT

A forage bale dryer is described, which is particularly adapted to dry large bales of forage material, such as hay, alfalfa, etc. The dryer has a bale support platform disposed between a lower and an upper plenum chamber, and the upper plenum chamber is spaced from the support platform to define an accessible stacking area for disposing one or more layers of forage bales onto the support platform. An air circulating passage is connected to the plenum chambers to direct a drying air flow there across. A sheet of flexible film material is disposed about the stack of bales and between the plenum chambers, whereby upon the application of a drying air flow, a negative pressure causes the flexible film material to collapse against the circumferential side surface of the stack of bales, whereby the drying air flow is confined through the stack. The drying air flow is also reversible by proper synchronization of valve plates in the air circulating conduits. The bidirectional airflow allows to achieve more uniform drying throughout the bales.

11 Claims, 6 Drawing Sheets

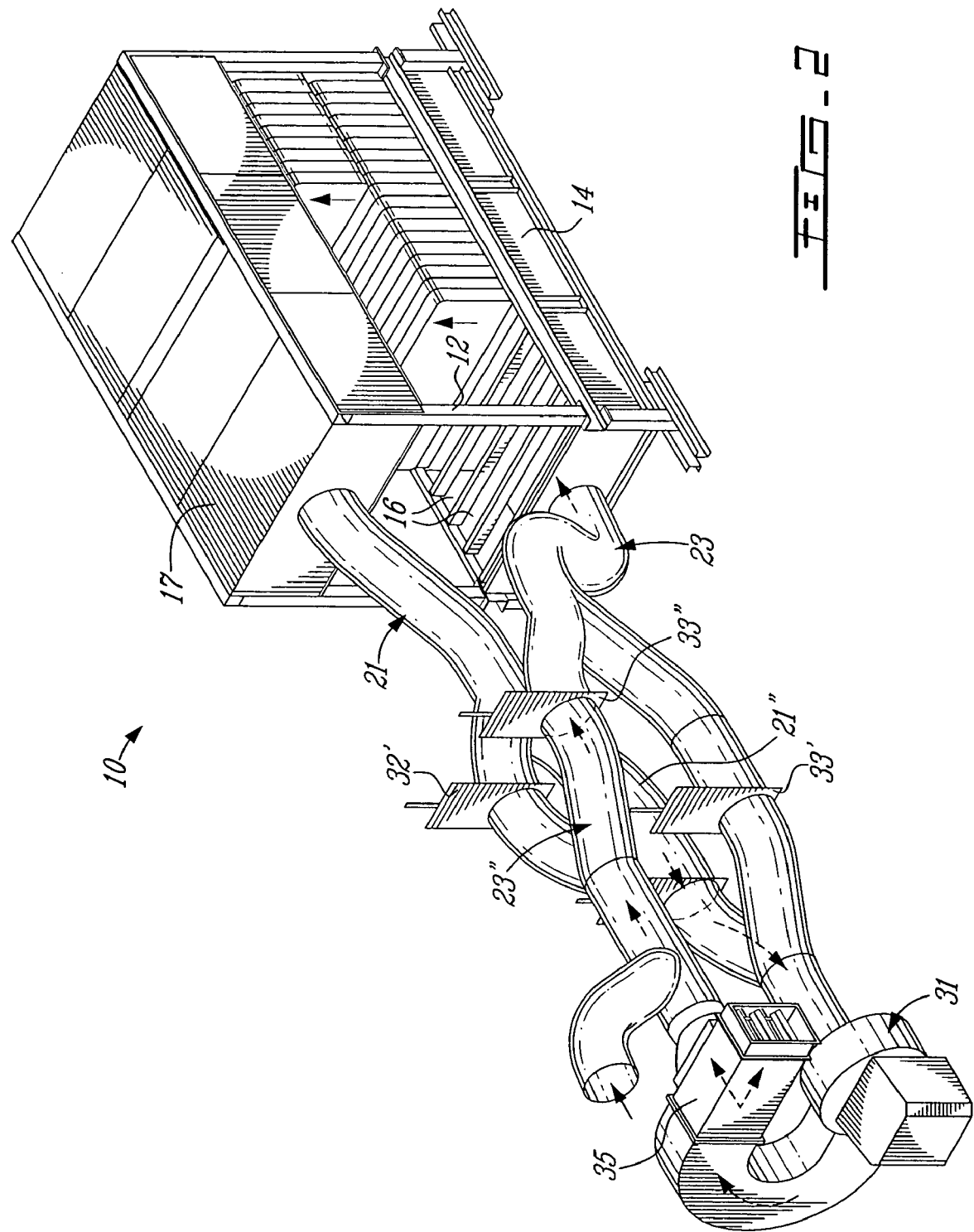

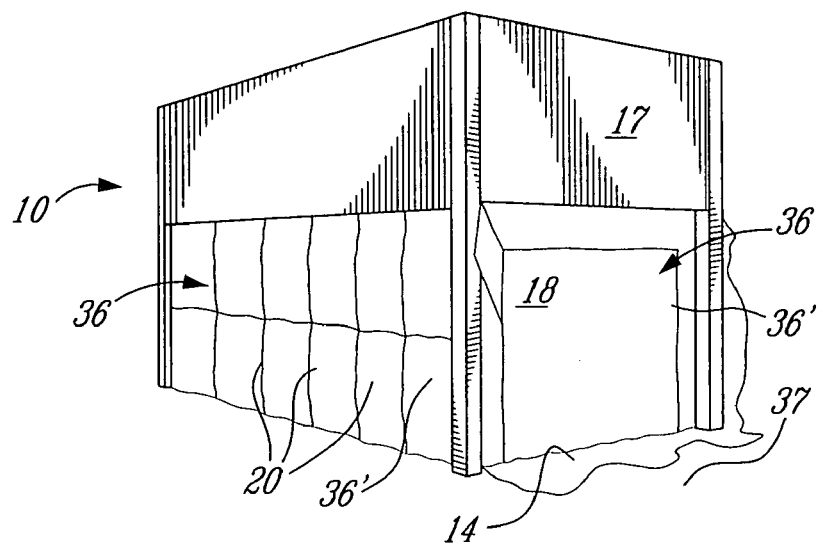
FIG_3
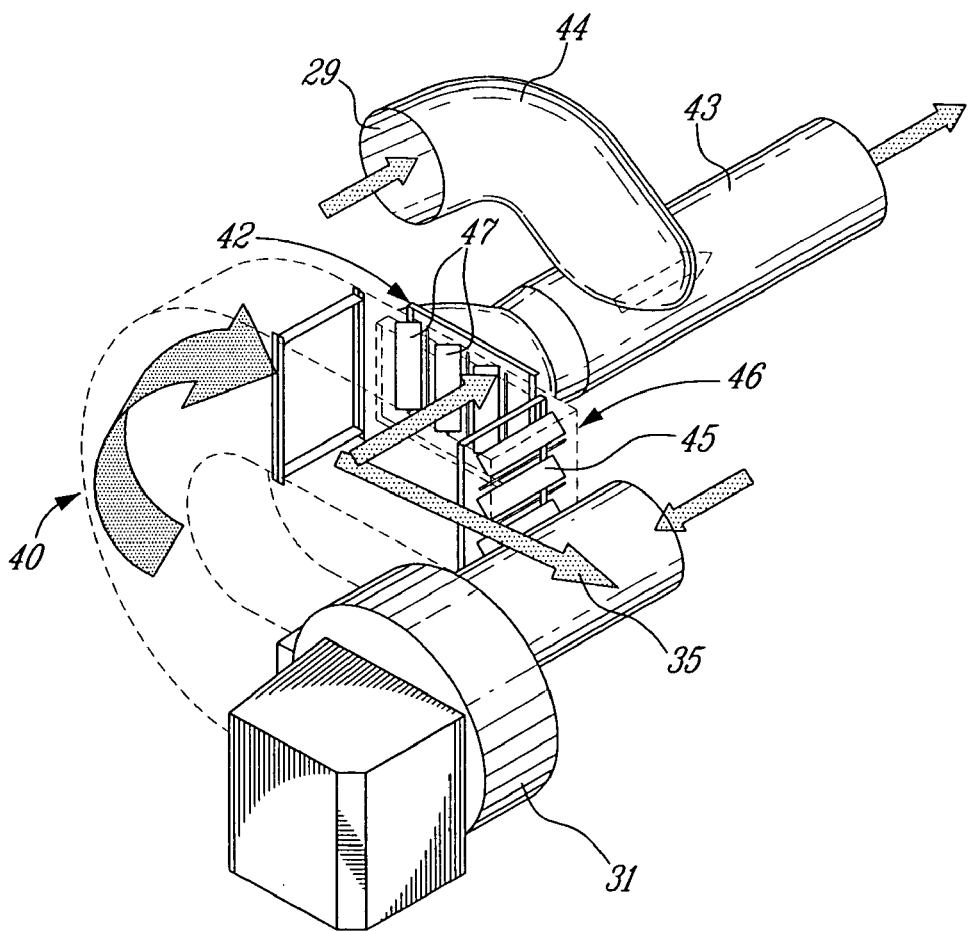
FIG_4

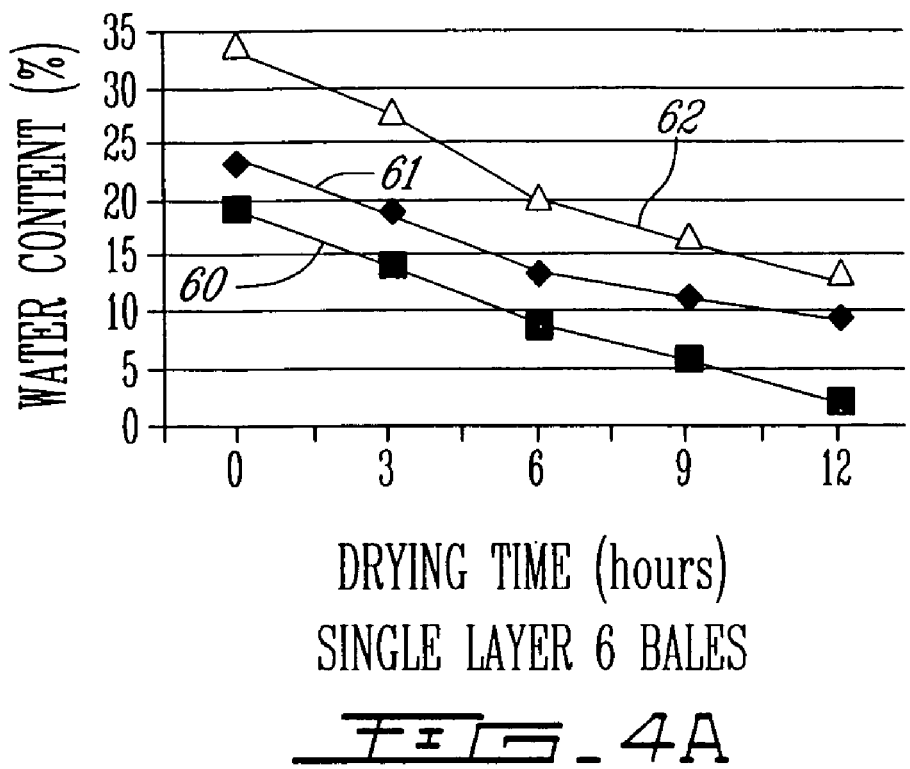
FIG_4A
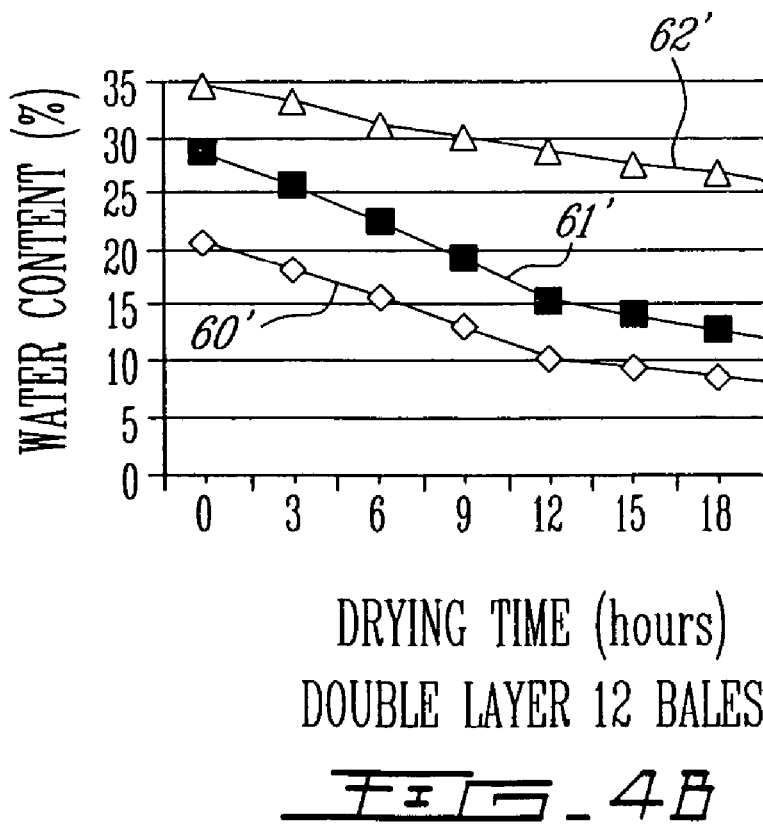
FIG_4B

DRYING TIME (hours)
SINGLE LAYER 6 BALES

DRYING TIME (hours)
DOUBLE LAYER 12 BALES

BIDIRECTIONAL FORAGE BALE DRYER AND METHOD OF OPERATION

TECHNICAL FIELD

The present invention relates to a forage bale dryer and particularly suited, but not exclusively, for the drying of large forage bales which heretofore have generally been dried naturally in their environment, without precise control of the moisture content, and have generally been unsuitable for proper commercialization thereof.

PRIOR ART

The storage of large quantities of forage bales such as hay bales is problematic in humid climates such as those found on the East coast of North America, and more particularly in Canada. In order to prevent the formation of mold, these bales must be stored with very low moisture and should not have more than 15% moisture therein. If the bales are high-density bales, then the water content should not be more than 10%. However, it is very difficult to extract the humidity content down to the 10% level, due to the relative humidity in the air and the short-time periods when it does not rain between mowing and baling. It is therefore desirable to artificially dry bales because of the unpredictable time available for field drying and the likelihood that water content will be higher than 15% at a suitable time for baling. By removing these bales quickly, with a higher content of humidity therein, the quality of the forage material is improved because of reduced leaf loss. Further, by diminishing the time that the bales are exposed to the sun, the color and the level of protein in the bale are also improved.

The production of forage material for commercial use requires a high density in order to reduce the transportation costs. The use of big balers for large rectangular bales and medium-size ones has been popular in recent years. However, uniform artificial drying is not easily achievable in these bales. There is therefore a need to dry large rectangular forage bales of high density, i.e. 200 kg of dry matter per cubic meter. Another problem with drying forage bales is that they become drier in their outer mass area and remain very humid at the center core.

In order to be able to store forage bales, the humidity content should be inferior to 15% and preferably inferior to 12%, if the bales are to be exported. If the humidity cannot be reduced to those levels in the field, one must utilize a conservation agent or the bales can be wrapped with a plastic material, and this greatly increases the production cost per unit. Currently, farmers treat their forage material with a conservation agent or wrap a large portion of their production.

Large rectangular bales can be pressed at relatively high dry matter densities, between 170 and 250 kg/m$^3$. In contrast, small rectangular bales are often pressed at relatively low dry matter densities, between 100 and 150 kg/m$^3$. To improve drying uniformity of large dense bales, it is useful to consider directing airflow in both directions, upwards and downwards through the bales. The quantity of moisture that will need to be removed depends on the size of the bale, its density and its initial moisture content at the time of harvest. For example, a large bale having the following dimensions of 0.81 m wide by 0.89 m high by 2.44 m long may contain 350 kg dry matter and will weigh 400 kg at 12% moisture, 450 kg at 22% moisture and 500 kg at 30% moisture. If the final desired moisture is 12%, the amount of water to be evaporated will be 50 or 100 kg per bale for bales harvested at 22% or 30% moisture, respectively.

Patent literature exists on the topic of forage bale drying, wherein air is directed across the bales by fans (blowers) to remove humidity. However, these systems have not been proven adequate to dry large or high density bales and substantially uniformly therethrough. References are made to U.S. Pat. No. 4,098,008, and U.S. Pat. No. 6,598,313, as well as EP patent application No. 0,534,382 A1.

SUMMARY OF INVENTION

It is a feature of the present invention to provide a forage bale dryer capable of drying large bales in large quantities, and in a quick and efficient manner.

According to the above features, for a broad aspect, the present invention provides a forage bale dryer which comprises a frame having a bale support platform with orifices to permit the passage of air. A lower plenum chamber is provided under the platform. An upper plenum chamber is supported by the frame and spaced at a predetermined distance above the platform. An access opening is defined between the platform and the upper plenum chamber. A surrounding wall is provided to substantially seal the opening after forage bales to be dried are disposed in a stack form on the platform, and surrounds a circumferential surface of the stack in close contact to confine a drying air flow between the plenum chambers substantially through the stack. An air convection conduit is in communication with each of the plenum chambers. Each air convection conduit has a first branch conduit in communication with a heat generating device at an air intake inlet, and a second branch conduit in communication with an air suction device adjacent an air outlet. A valve element is provided in each of the branch circuits. A control means is also provided to close or open the valve elements, whereby to direct a drying airflow and create a negative pressure through the forage bales disposed on the platform from above or below the bales, through the upper and lower plenum chambers.

DESCRIPTION OF DRAWINGS

A preferred embodiment of the present invention will now be described, with reference to the accompanying drawings in which:

FIG. 2 is a perspective view similar to FIG. 1, and illustrating the control airflow direction in the dryer;

FIG. 3 is a perspective view showing the forage bale dryer in operation with sidewall sealing provided by the flexible sheet material collapsed against the stack of forage bales;

FIG. 4 is an enlarged perspective view illustrating the construction of the air recirculation system;

DESCRIPTION OF PREFERRED EMBODIMENTS

Figure 1:
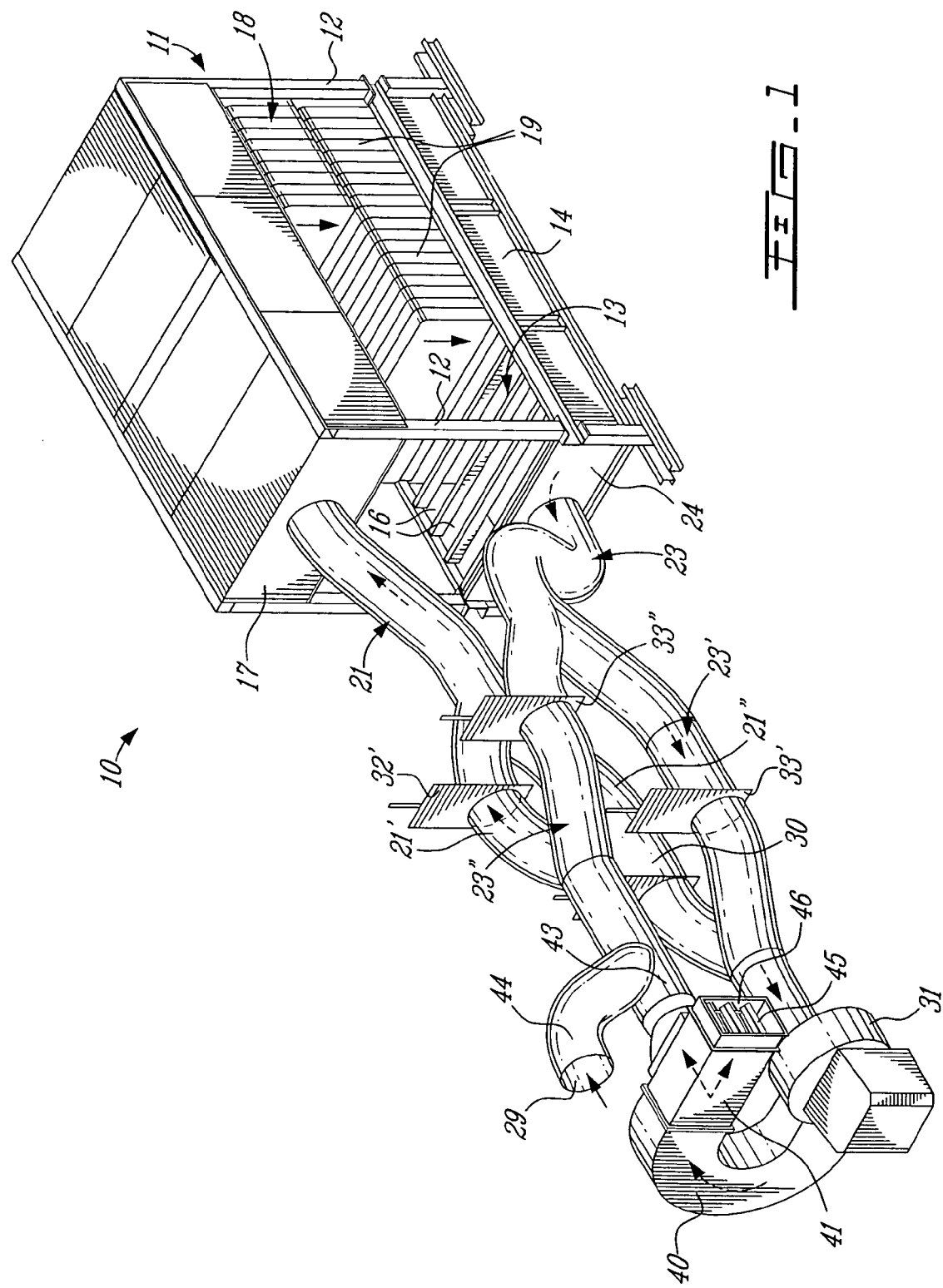
FIG. 1 is a perspective view illustrating the construction of the forage bale dryer of the present invention.

Referring now to the drawings, and more particularly to FIG. 1, there is shown generally at 10 a forage bale dryer constructed in accordance with the present invention. The dryer comprises a steel frame 11 of substantially rectangular outline, and having upright corner posts 12 and a bale support platform 13 secured in a lower part thereof. A lower plenum chamber 14 of rectangular outline is secured under the bale support platform 13. The frame is constructed of steel beams and sheeting, and the bale support platform is constituted by a plurality of horizontal transverse steel beams 15, equidistantly spaced apart, to define drying orifices 16 therebetween.

An upper plenum chamber 17, also of rectangular outline, is secured to the upright corner posts 12 and spaced at a predetermined distance above the bale support platform 13, whereby to define a bale stacking area 18 between the bale support platform 13 and the upper plenum chamber 17. The bale stacking area is open on one or all sides thereof to constitute a loading opening 19, whereby bales of forage material 20 can be disposed and removed from the bale support platform 13 by heavy machinery, such as forklift tractors.

An upper plenum air flow conduit 21 connects to an end wall 22 of the upper plenum chamber 17. A bottom plenum air flow conduit 23 connects to an end wall 24 of the lower plenum chamber 14.

The air flow conduit 21 has a first branch conduit 21' in communication with a heat generating device 30, which is in communication and downstream from a fresh air intake inlet 29. It also has a second branch conduit 21" in communication with an air suction device 31, which is in communication and upstream from the air outlet 35. Similarly, the air flow conduit 23 of the lower plenum chamber has a first branch conduit 23" in communication with the heat generating device 30, and a second branch conduit 23' in communication with the air suction device 31.

Valve elements in the form of valve plates 32' and 32" are associated with each of the first and second branch conduits of airflow conduit 21, while valve plates 33' and 33" are associated with first and second branch conduits of airflow conduit 23.

As shown in FIG. 1, valve plate 32' secured in the first branch conduit 21' is open and thereby admitting heated air from the air intake inlet 29 to the upper plenum chamber 17. Also, valve plate 33', which is connected in branch conduit 23' of the lower plenum chamber 14 is open, whereby to permit the passage of air from the lower plenum chamber to the air evacuation outlet 35. The air suction device 31 pulls the air from the lower plenum chamber 14 and accordingly, the air flow is from the upper plenum chamber down through the lower plenum chamber, and through the bales 20 disposed on the bale support platform.

To reverse air flow direction, valve plates 32' and 33' are closed while valve plates 32" and 33" are opened as in FIG. 2. Now, valve plate 33" secured in the branch conduit 23" is open and thereby admitting heated air from the air intake inlet 29 to the lower plenum chamber 14. Also, valve plate 32", which is connected in branch conduit 21" of the upper plenum chamber 17 is open, whereby to permit the passage of air from the upper plenum chamber to the air evacuation outlet 35. The air suction device 31 pulls the air from the upper plenum chamber 17 and accordingly, the air flow is from the lower plenum chamber up through the upper plenum chamber, and through the bales 20 disposed on the bale support platform.

The airflow direction can be reversed automatically or manually by simultaneously closing valve plates 32" and 33" and opening valve plates 32' and 33' to have airflow downward from the upper plenum to the lower plenum, as in FIG. 1, and then by simultaneously opening valve plates 32" and 33", and closing valve plates 32' and 33' to have airflow upward from the bottom plenum to the upper plenum, as in FIG. 2. Opening and closure of the four valve plates must be done synchronously to ensure that heated air flows to only one plenum and air from the opposite plenum only is pulled by the air suction device. The frequency of airflow direction change will depend on the type and density of bales, the height of the bale stack and the desired final moisture content after drying.

With reference to FIG. 3, it can be seen that the bale stacking area 18, after it has been loaded with a stack of bales 20, is surrounded by a wall membrane (wall means) herein constituted by a sheet of flexible polyethylene material 36, which extends about the stack and between the upper plenum chamber 17 and the lower plenum chamber 14. The lower plenum chamber 14 is herein shown as a plenum cavity in the floor 37 of an enclosure in which the dryer is disposed. This polyethylene sheet 36 is fastened about the plenum chambers by a suitable attachment means (not shown) and is loosely disposed about the bale stacking area 18. As soon as the air suction device 31 is actuated, a negative pressure is created between the plenum chambers and across the stack of bales 20. This negative pressure causes the sidewalls 36' of the polyethylene sheet material 36 to collapse against the bales and substantially seal the surrounding side surface of the stack, whereby to prevent interstices or voids between the sheet and the surrounding surfaces of the stack whereby to confine the drying air flow between the plenum chambers and substantially through the stack. The polyethylene sheet material is of sufficient thickness to resist tearing under the negative pressure of the air flow across the plenum chambers and its contact with the fibers in the surrounding surfaces of the stack.

As further illustrated in FIG. 4, an air recirculation conduit 40 is secured downstream of the air suction device 31, whereby aspired air is directed into an exhaust chamber 41, adjacent to the air evacuation outlet 35. An air recirculating port 42 is disposed in a sidewall of the air exhaust chamber 41 and connects to an air inlet duct 43, which has a branch duct 44 at the end of which is the air intake inlet 29. Air flow controlling gates in the form of pivotal louvers 45 are secured across the air exhaust port 46 of the air evacuation outlet 35. Similar pivotal louvers 47 are secured across the recirculating port 42. Therefore, by controlling the position of these louvers, the size of the openings can be controlled, thereby varying the quantity of air being exhausted or recirculated, and within the range of 0 to 100%. A controller device, which may be manually or computer controlled, operates motors or mechanical devices not shown to operate the louvers.

Figure 5:
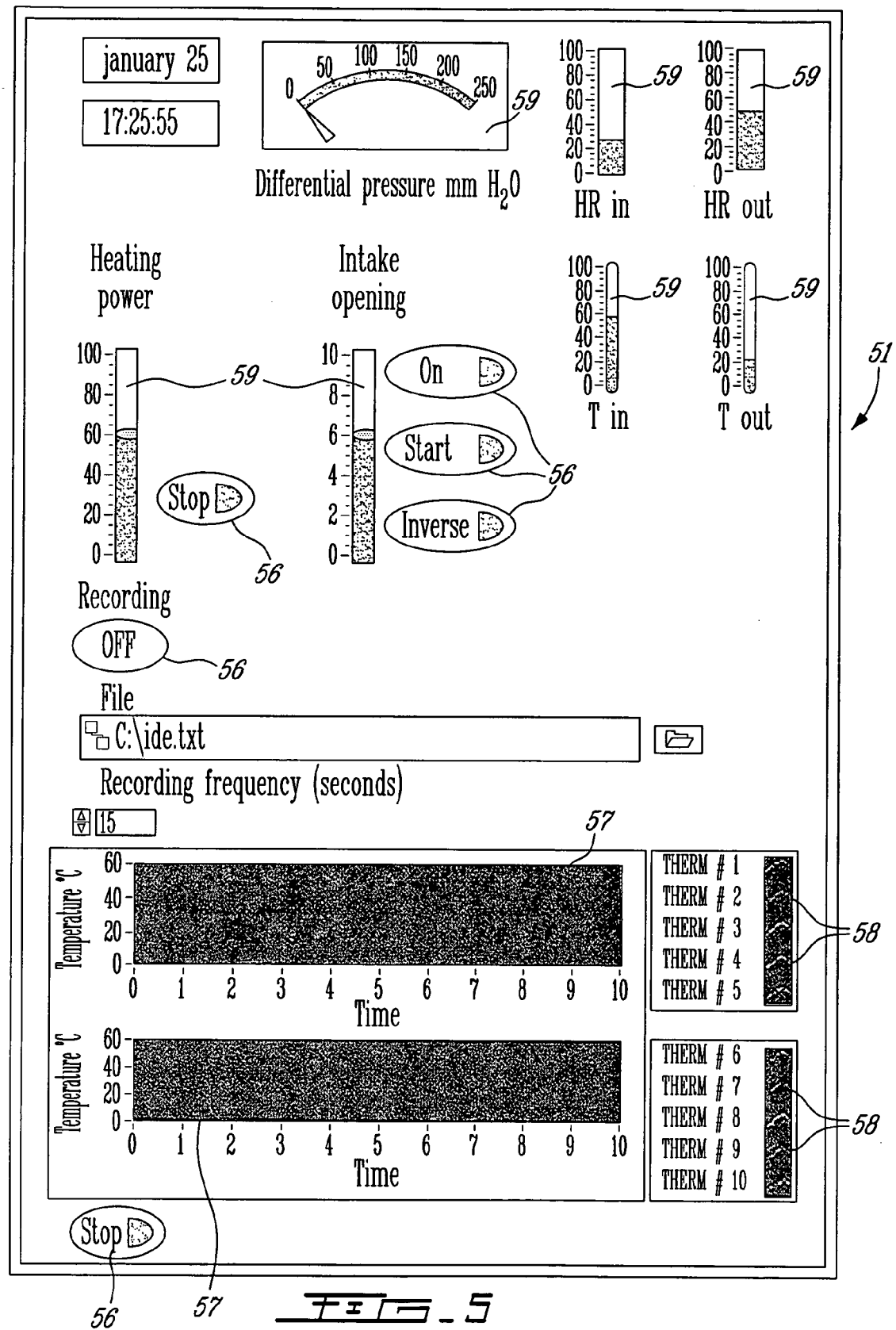
FIG. 5 is a front view of the control module.

As shown in FIG. 5, a control monitor 51 is accessible to an operator, whereby to start and stop the system, to invert the flow of drying air and to monitor the conditions of the system. In order to do so, temperature and humidity sensing devices are connected to the air flow conduits 21 and 23 and to the controller device. The monitoring is performed by an algorithm in the computer's memory, which controls the parameters of the system. Sensing devices are also connected to the motor of the air blower 31, whereby to monitor the current drawn by the motor to give an indication of the power consumption and air flow rates. The heat generating device 30 also has an on/off switch and a power regulator which allows to vary heating power between 0 and 100% of maximum.

The control monitor 51 is a user friendly control panel provided with control switches 56 and screen displays 57, which indicate the characteristics of the monitored thermostats which can be selected by switches 58. Various other display devices 59 are provided to monitor the operation of the system's parameters. The system also controls relays not shown to start and stop the air suction device 31 and the heat generating device 30. The system can be entirely automatic but the interface panel 51 provides manual control, particularly if there are problems with the computer. It operates in parallel with the computer. To comply with safety standards, the system is also purged automatically, whereby air and other gases are evacuated from the plenums before the heat generating device is turned on.

Although the forage bale dryer as shown in FIGS. 1, 2, 3 and 4 was conceived for use indoors, it can also be utilized outdoors and be displaceable. Accordingly, the dryer can be transported to different sites instead of transporting the forage bales to a processing site.

As previously described, the frame and sheet material covering the plenum chambers must be designed and chosen to support the suction pressure exerted in the dryer. The actual pressure will depend on the type of forage material being dried, its density, the height of the bale stack and the airflow. For example, first cut alfalfa can be baled at a dry matter density of approximately 190 kg/m$^3$. Second cut alfalfa, wherein the stems are much finer, can have a dry matter density in the order of 210 kg/m$^3$. On the other hand, orchard grass can have a dry matter density considerably higher in the order of 255 kg/m$^3$. In bale stacks between 0.9 and 1.8 m in height, typical air velocities between 0.1 to 0.2 ml/s will result in a pressure drop between 0.15 and 0.30 m of water or 1.6 and 3.2 kPa (0.23 and 0.46 psi).

Figure 6A:
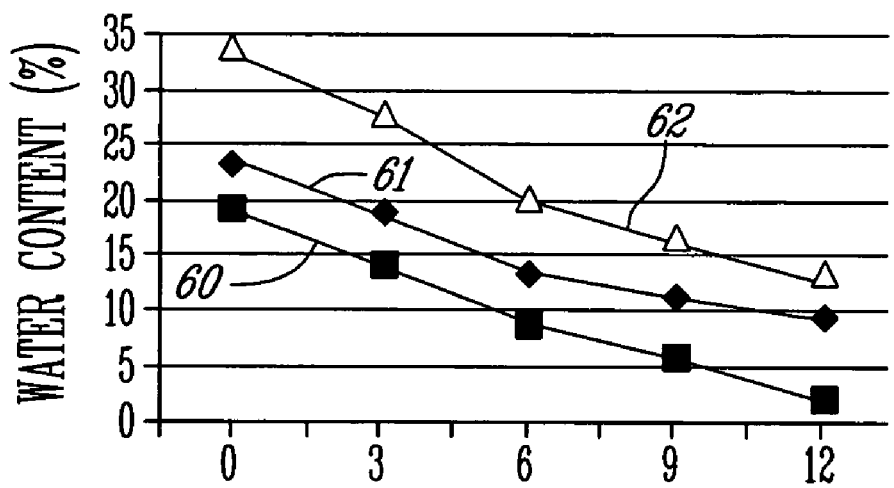
FIGS. 6A and 6B are graphs illustrating the average water content in the bales and drying time required to dry a single layer of six bales with the dryer of the present invention, and a double layer of 12 bales, and further indicating the decrease in water content during this drying time.
Figure 6B:
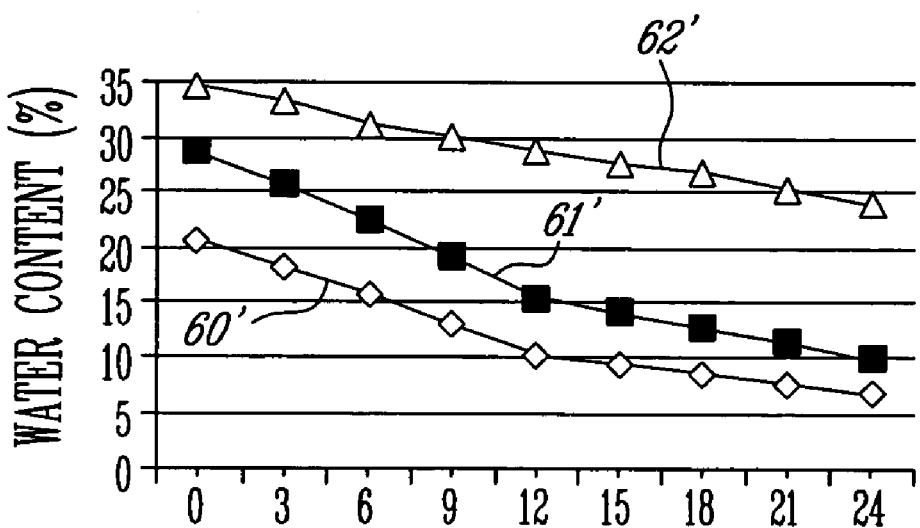

FIGS. 6A and 6B are graphs illustrating the operation of the dryer of the present invention. Air was heated to 60° C. and flowed across the support platform. As shown in FIG. 6A, a single layer of six bales of hay, each bale measuring 0.81 m×0.89 m×2.48 m in size, were positioned over the drying platform, and subjected to a drying air flow having an average velocity between 0.10 and 0.20 m/s, and the system was operated for a period of twelve hours. The desired percentage of humidity of 12% could be achieved after between 4 and 12 hours of drying, depending on the initial moisture content. With a double layer, namely 6 bales of forage on the first layer and 6 other bales superimposed on top of the first layer, it took approximately 10 hours to bring the percentage of humidity down from 21% to 12%, and approximately 20 hours from 28% to 12%.

Examples shown in FIGS. 6A and 6B all include a change in air flow direction, usually after 6 h, 12 h and 18 h (in the case of 2-layer bales). Bidirectional air flow is expected to reduce energy requirements by between 15% and 35%, as compared with unidirectional airflow, because drying time and overdrying can be reduced. Therefore, with a bidirectional flow, the drying is more uniform while reaching the desired moisture content.

Briefly summarizing the method of operation of the dryer, a predetermined number of bales of forage material are disposed on the support platform and in close contact with one another to form a stack. The stacking area is sealed between the lower and upper plenum chambers by a polyethylene sheet, which surrounds the circumferential side surface of the stack. The air blower is turned "on" and thereafter the heat generating device, whereby to create a drying air flow in the air circulating ducts and across the plenum chambers, whereby a negative pressure is created across the stack to remove humidity therefrom. The direction of air flow is inverted, whereby to achieve a substantially uniform drying throughout the bales in the stack. If the air flow was only from one side of the stack, then the side in which the air flow enters the stack would be drier than the side where the air flow exits the stack. The air exiting one of the plenum chambers may be recirculated back into the inlet conduit in desired quantities depending on the adjustment of the pivotal louvers in the recirculating port and evacuation outlet ports. As described above, the temperature and humidity of the drying air flow are monitored as well as the current consumption of the air blower to provide operating parameters to the computer in the controller. An operator can intervene with the controller by the use of an interface module, as illustrated in FIG. 5.

It is within the ambit of the present invention to cover any obvious modifications of the preferred embodiment described herein, provided such modifications fall within the scope of the appended claims.

What is claimed is:

1. A bidirectional forage bale dryer comprising a frame, a bale support platform with orifices to permit the passage of air, a lower plenum chamber, an upper plenum chamber, an access opening for access to said platform, a surrounding wall to substantially seal said forage bales disposed in a stack on said platform and surrounding a circumferential side surface of said stack in close contact to confine a heated drying air flow connected between said plenum chambers and through said stack, an air flow conduit in communication with respective ones of said lower and upper plenum chambers, each air flow conduit having a first branch conduit in communication with a heat generating device at an air intake inlet, and a second branch conduit in communication with an air suction device adjacent to an air outlet, a valve element in each said branch conduit, and means to close or open said valve elements whereby to direct said drying air flow upwards or downwards through said stack of forage bales to create a negative pressure through said forage bales disposed on said platform between said upper and lower plenum chambers.

2. A bidirectional forage bale dryer as claimed in claim 1, wherein said surrounding wall is constituted by a sheet of flexible material capable of adhering to said side surface of said forage bale stack by negative pressure, thereby substantially sealing voids about said side surface of said bales in said stack.

3. A bidirectional forage bale dryer as claimed in claim 2, wherein said sheet of flexible material is a polyethylene sheet capable of resisting to tearing when displaced against said stack by said negative pressure.

4. A bidirectional forage bale dryer as claimed in claim 1, wherein said air intake inlet comprises a fresh air intake conduit and air recirculating conduit, said air recirculating conduit being connected between said air outlet and said air suction device, an exhaust chamber adjacent said air outlet, said exhaust chamber having an air exhaust port and an air recirculating port which is connected to said heat generating device, and control gates to vary the opening of said exhaust port and said recirculating port whereby to control the amount of air to be recirculated through said heat generating device within the range of from 0% to 100%.

5. A bidirectional forage bale dryer as claimed in claim 4, wherein said control gates are constituted by a plurality of pivotal louvers secured across said exhaust port and recirculating port, and secured to motorized or hand controlled mechanical couplings to tilt said louvers to any position between a fully open to a fully closed position to control the air flow through said ports.

6. A bidirectional forage bale dryer as claimed in claim 1, wherein a negative pressure is in the range of about 3.2 kPa (0.46 psi), said frame being a rigid steel frame and said plenum chambers having a rigid wall structure capable of supporting exerted pressure.

7. A bidirectional forage bale dryer as claimed in claim 1, wherein said forage bales have variable dimensions and are placed side by side to cover the full area of the said bale support platform on at least one layer.

8. A bidirectional forage bale dryer as claimed in claim 7, wherein bales may be disposed on two or more layers, one on top of another.

9. A bidirectional forage bale dryer as claimed in claim 1, wherein there is further provided humidity and temperature sensing devices connected to said first and second branch conduits and to control means to monitor the temperature and humidity of air flowing in said conduit, said control means having an algorithm to monitor signals from said sensing devices and to operate said heat generating device and air suction device, and current sensing means connected to a motor of said air suction device and said control means to monitor power consumption and air flow rate.

10. A bidirectional forage bale dryer as claimed in claim 9, wherein said heat generating device is designed to raise air temperature to at least 60° C., considering the actual airflow requirement which depends on the bale platform area, the bale stack height and the ambient air temperature, heat generating device and air suction device.

11. A bidirectional forage bale dryer as claimed in claim 1, wherein said lower plenum chamber is located under said support platform, said upper plenum chamber being supported by said frame at a predetermined distance above said support platform.

* * * * *

UNITED STATES PATENT AND TRADEMARK OFFICE
CERTIFICATE OF CORRECTION

PATENT NO. : 6,988,325 B2
DATED : January 24, 2006
INVENTOR(S) : Savoie, Philippe et al.

It is certified that error appears in the above-identified patent and that said Letters Patent is hereby corrected as shown below:

<u>Title page,</u>
Item [12], should read -- Savoie et al --.

Signed and Sealed this

Twenty-fifth Day of April, 2006

JON W. DUDAS
*Director of the United States Patent and Trademark Office*